United States Patent
Belagal Math et al.

(10) Patent No.: US 11,036,275 B2
(45) Date of Patent: Jun. 15, 2021

(54) DETECTION OF KNOWN WORKLOAD PATTERNS

(71) Applicant: Intel Corporation, Santa Clara, CA (US)

(72) Inventors: Shravan Kumar Belagal Math, Bangalore (IN); Noor Mubeen, Bangalore (IN); Harinarayanan Seshadri, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 116 days.

(21) Appl. No.: 16/369,643

(22) Filed: Mar. 29, 2019

(65) Prior Publication Data

US 2020/0310510 A1 Oct. 1, 2020

(51) Int. Cl.
*G06F 1/00* (2006.01)
*G06F 1/324* (2019.01)
*G06N 20/00* (2019.01)
*G06F 17/16* (2006.01)
*G06F 1/3203* (2019.01)

(52) U.S. Cl.
CPC .............. *G06F 1/324* (2013.01); *G06N 20/00* (2019.01); *G06F 1/3203* (2013.01); *G06F 17/16* (2013.01)

(58) Field of Classification Search
CPC ........... G06F 1/324; G06F 20/00; G06F 17/16
USPC ........................................................ 713/322
See application file for complete search history.

(56) References Cited

U.S. PATENT DOCUMENTS

| 9,207,738 B2 | 12/2015 | Struik | |
| 2008/0201591 A1* | 8/2008 | Hu | G06F 1/329 713/323 |
| 2012/0102345 A1* | 4/2012 | Park | G06F 1/3228 713/322 |
| 2013/0061069 A1 | 3/2013 | Thomson et al. | |
| 2014/0225658 A1* | 8/2014 | Moore | G06F 1/3296 327/262 |
| 2015/0148981 A1* | 5/2015 | Kong | G06F 1/206 700/299 |
| 2015/0220097 A1* | 8/2015 | Kwong | G06F 1/206 700/291 |

(Continued)

FOREIGN PATENT DOCUMENTS

KR 1020150073839 7/2015

OTHER PUBLICATIONS

International Search Report & Written Opinion dated Jun. 5, 2020 for PCT Patent Application No. PCT/US2020/017277.

*Primary Examiner* — Volvick Derose
(74) *Attorney, Agent, or Firm* — Green, Howard & Mughal LLP

(57) ABSTRACT

Described are mechanisms and methods for applying Machine Learning (ML) techniques for power management at different levels of a power management stack. An apparatus may comprise a first circuitry, a second circuitry, and a third circuitry. The first circuitry may have a plurality of memory registers. The second circuitry may be operable to establish values for a plurality of features based on samples of values of the plurality of memory registers taken at one or more times within a range of time of predetermined length. The third circuitry may be operable to compare the plurality of features against a plurality of learned parameters for a reference workload.

19 Claims, 5 Drawing Sheets

(56) References Cited

U.S. PATENT DOCUMENTS

| | | | |
|---|---|---|---|
| 2015/0241942 A1* | 8/2015 | Venumuddala | G06F 1/3206 |
| | | | 713/320 |
| 2016/0054940 A1 | 2/2016 | Khoueir et al. | |
| 2016/0239074 A1* | 8/2016 | Lee | G06F 1/3287 |
| 2016/0320825 A1* | 11/2016 | Panda | G06F 1/3206 |
| 2017/0205863 A1* | 7/2017 | Lee | G06F 1/324 |
| 2017/0242729 A1 | 8/2017 | Chen et al. | |
| 2018/0183543 A1* | 6/2018 | Kim | G06F 13/00 |
| 2018/0321980 A1* | 11/2018 | Lo | G06F 9/4887 |
| 2018/0349760 A1* | 12/2018 | Das | G06N 3/063 |

* cited by examiner

DETECTION OF KNOWN WORKLOAD PATTERNS

BACKGROUND

Workload detection for system-on-chip (SoC) designs may be based on loading. Meanwhile, power management state governance may include governance of performance states relating to optimization of voltage, frequency, or both during operation. To deal with certain types of workloads, power management state governance may listen to operating system (OS) events, and/or may react based on load pattern changes.

However, two workloads may require different frequency selection, even if the load is seemingly the same over some time window. Moreover, the same workload may have more than one pattern for the same time window, due to other possible background activities. Accordingly, such approaches may be less generic than desirable.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
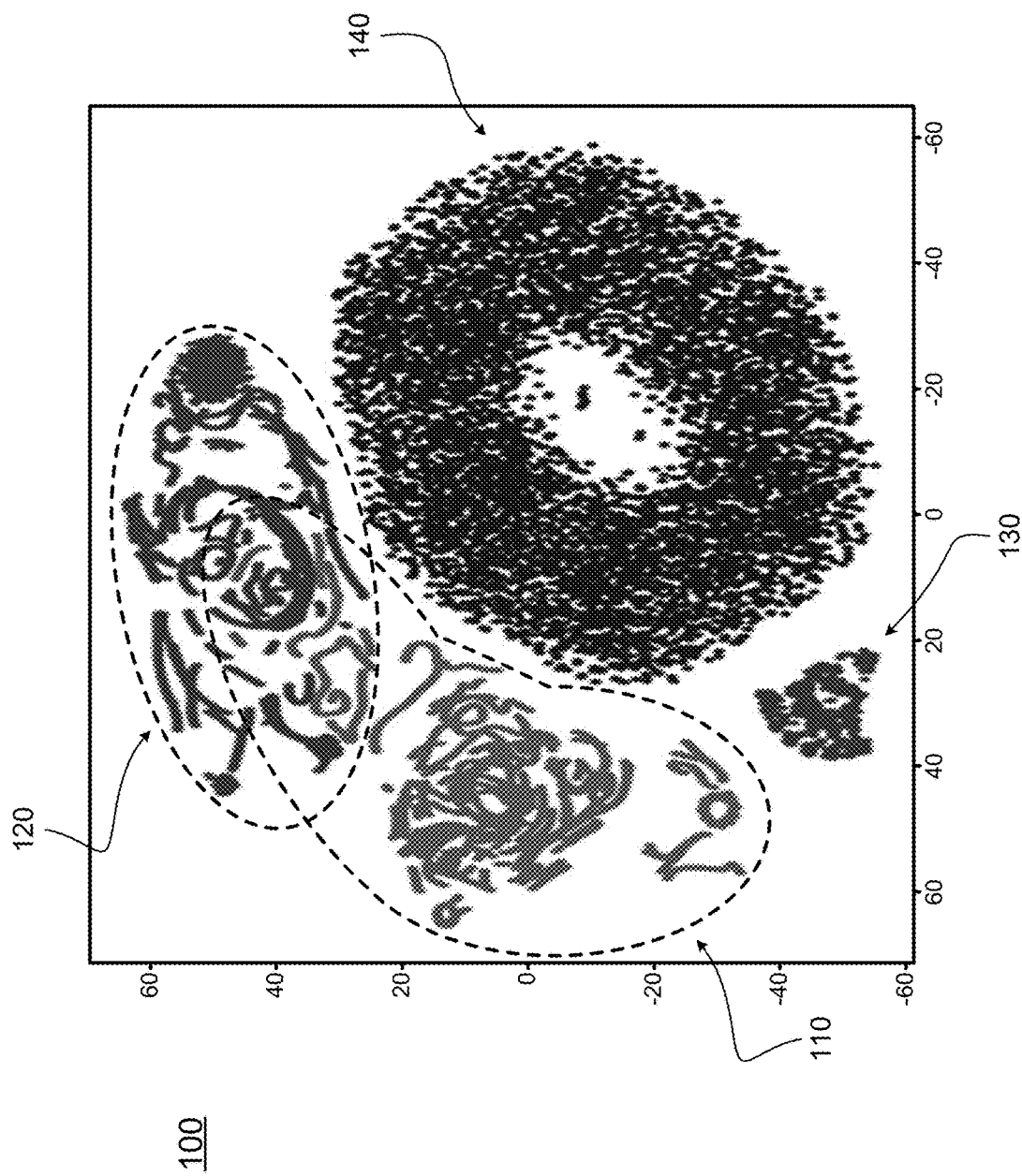
FIG. 1 illustrates a representation of various workloads in a two-dimensional space using T-distributed Stochastic Neighbor Embedding (t-SNE), in accordance with some embodiments of the disclosure.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Presently, workload detection on for system-on-chip (SoC) designs may be based on load (e.g., "utilization" or "active core time," which may be a percentage). Meanwhile, power management state governance may include governance of performance states, or "p-states," relating to optimization voltage and/or CPU frequency during operation. To deal with certain types of workloads (e.g., low-response workloads like editing word documents, video play-back workloads, and/or responsive workloads such as web browsing), power management state governance may listen to operating system (OS) events, and/or may react based on load pattern changes.

However, such approaches may be less generic than desirable. For example, two workloads may require different frequency selection, even if load (e.g., utilization) is seemingly the same over some time window. For example, one scenario may involve high memory Input/Output (I/O) traffic. As another example, the same workload may have more than one pattern for the same time window, due to other possible background activities.

Some active power management techniques for a block or portion of a design (e.g., an intellectual property core, or "IP") may be based on a combination of firmware components and operating system components sometimes called a "governor." The governor may monitor a utilization of the IP (e.g., over some period of time) and a scalability of the IP (e.g., a representation of how workloads might scale with changes in frequency). Based on a change observed in utilization (such as an increase or decrease in utilization), the governor may request a higher frequency or a lower frequency. Most Dynamic Voltage and Frequency Scaling (DVFS) capable IPs—like Central Processing Units (CPUs), Graphics Processing Units (GPUs), Image Processing Units (IPUs), and so forth—may implement similar utilization-based governance techniques.

Other active power management techniques may involve obtaining names from an operating system of applications or types of applications running in the foreground and/or the background. This information may then considered (along with parameters such as those discussed above) in establishing an IP's frequency and/or power.

These techniques are relatively static and may need to be manually fine-tuned for different workloads, or for different tradeoffs between power, performance, and/or responsiveness. They may suffer from various other disadvantages as well.

First, DVFS algorithms for IPs—and/or their frequency selections—might be tuned merely for a few specific workloads. As a result, if tuned to meet a relatively high-performance target (e.g., browsing), power consumption for productivity workloads may increase. Current implementations may accordingly present tradeoffs between optimization vectors.

Second, customers may request higher performance for specific sets of workloads. This may result in complete tuning exercises for present frequency selection algorithms (e.g., to ensure that the specific sets of workloads do not cause negative impact on other workloads).

Third, customers may request lower power for a few workloads in order to obtain longer battery life. This may result in complete tuning exercises for present frequency selection algorithms, which may result in decreased performance for other workloads.

Fourth, making power management decisions based on lists of foreground processes and/or background processes may be impractical due to unlimited newer workloads that an end-user may run. As a result, such solutions may not be scalable.

Fifth, the number of foreground processes and background processes, and their combinations, will generally be enormous. As a result, solutions based on analyzing such sets of processes trend toward being infeasible. Such solutions may not be able to account for activity of background processes.

Based on these disadvantages, an alternate generic solution that can dynamically evolve response patterns to existing known workloads, as well as to newer workloads, may be desirable.

Discussed herein are mechanisms and methods for implementing a smart power management architecture employing SoC usage data (e.g., counters) to classify workloads and to take optimal power-management actions based on recognized patterns. Features used to classify workloads may be obtained from various power management telemetry information (e.g., CPU registers, GPU registers, SoC power state information, memory bandwidth, and so forth). Various power management (PM) telemetry information (e.g., SoC counters and/or Model Specific Registers (MSRs)) may be used to learn about workload patterns. Such information may then be used to guide different layers of power management algorithms in firmware and/or software. This may serve as a foundation for more complex power management optimization algorithms.

As disclosed herein, Machine Learning (ML) techniques may be applied at different levels of a power management stack to meet user requirements efficiently. Such techniques may have two primary components.

In a first component, workload patterns may be detected using parameters learned offline. Hints may be provided about detected patterns, at a coarse granularity of workload type (e.g., considering video playback workloads versus browsing workloads versus productivity workloads) or at a finer granularity of workload type (e.g., considering the multi-threaded nature of workloads, or specific cores which seem to be better suited to run a workload).

In a second component, actions may be performed based upon a detected workload pattern. For example, actions such as changing an Energy Performance Preference (EPP) value, capping an IP's power limit, and/or capping an IP's frequency may be taken at a level of a power management stack based upon hints provided for that level. Actions may result in increased performance, better responsiveness, and/or lower power consumption.

An algorithm pertaining to these mechanisms and methods may include the following three aspects. First, SoC counters may be used to detect classes of known patterns that are of interest while a system is running. Second, detecting a class of known patterns may help a component or system take appropriate actions, such as power allocation or frequency setting for IPs. Mapping actions for a class of known patterns may be dependent on one or more efficiency metrics and/or customer requirements, for example.

Third, hints may be used for various power management decisions at different granularities. At a Dynamic Platform and Thermal Framework (DPTF) and/or system level, power management decisions may pertain to thermals and/or power balancing. At the OS level, power management decisions may pertain to scheduler hints, hetero IP scheduling, and/or power balancing. At the IP level, power management decisions may pertain to load prediction, hints into CPU/GPU/

IPU firmware that may help DVFS governance logic of IPs to allocate power budgets, performance budgets, and/or energy budgets more accurately.

Currently, frequency selection algorithms for IPs may be based on load and/or scalability (e.g., of CPUs, GPUs, and so forth). These algorithms might not consider the type of workload, so the same frequency may be is selected for the same value of load and scalability (or rates of change of those values) even though the load may be coming from different types of workloads.

In comparison, predicting the type of workload may be advantageous in various ways. First, it may facilitate executing differently-tuned algorithms (e.g., for each type of workload). Second, it may facilitate achieving higher energy efficiencies for identified workload types. Third, it may facilitate achieving desired performance targets and/or power targets.

Various workload categories and their performance expectations may include high-response workloads, low-response workloads, video playback workloads, and/or gaming workloads. High-response workloads may primarily load CPUs. This category of workloads may be associated with sudden spikes in load. In turn, spiked loads might be addressed with higher frequencies to help meet user experience. High-response workloads may include, for example, web browsing.

Low-response workloads may include user productivity applications (e.g., typing email, word-processing documents, or presentations) that primarily load CPUs, but for which frequency requirements may not be high in comparison with the high-response category. This category of workloads can satisfy user-experience targets with lower frequencies than for high-response workloads. If one frequency $F_{HIGH}$ is granted to serve a load L for a high-response workload, a different frequency $F_{LOW}$ may be granted to serve the same load L for a low-response workload (e.g., for productivity applications) such that $F_{LOW} < F_{HIGH}$, which may advantageously save power while providing a satisfying user experience.

Video playback workloads (and other similar workloads) may load CPUs and/or media-processing portions of GPUs lightly. For this category of workload, there may be a cap on a maximum number of Frames Per Second (FPS) that can be obtained. Overall power consumption may be mostly under an SoC power limit. In this category, power saving may be a primary criteria for frequency selection.

Gaming workloads may load both a CPU and rendering portions of a GPU heavily. These workloads may consume relatively high power, which may lead an SoC power to cross its power limit. Under this category, an SoC power limit may be divided primarily between a CPU and a GPU to facilitate achieving a maximum FPS. While dividing power, factors like allocating more power to a CPU when a GPU is starving, and the increased power usage of a GPU for same load compared to a CPU may be taken into account.

The categories of workloads mentioned above are merely examples. Other workloads and/or categorizations of workloads may exist which may be used to differentiate workloads through patterns. Patterns of workload types may be visualized in various ways. Workloads may correspond with patterns of various numbers of features. Considering each of these features as a "dimension," a high-dimension space may be converted to a two-dimensional space and plotted as a graph in x and y coordinates.

FIG. 1 illustrates a representation of various workloads in a two-dimensional space using T-distributed Stochastic Neighbor Embedding (t-SNE), in accordance with some embodiments of the disclosure. A scenario 100 may comprise a first representation 110 of a low-response workload, a second representation 120 of a high-response workload, a third representation 130 of a video playback workload, and a fourth representation 140 of a gaming workload.

As depicted in scenario 100, when higher-dimensional representations of various workloads are converted to fewer dimensions, the workloads may be distinguished from each other. Notably, there is a region of overlap between low-response workloads related to first representation 110 and high-response workloads related to second representation 120 (which might be resolvable with better training data).

Figure 2:
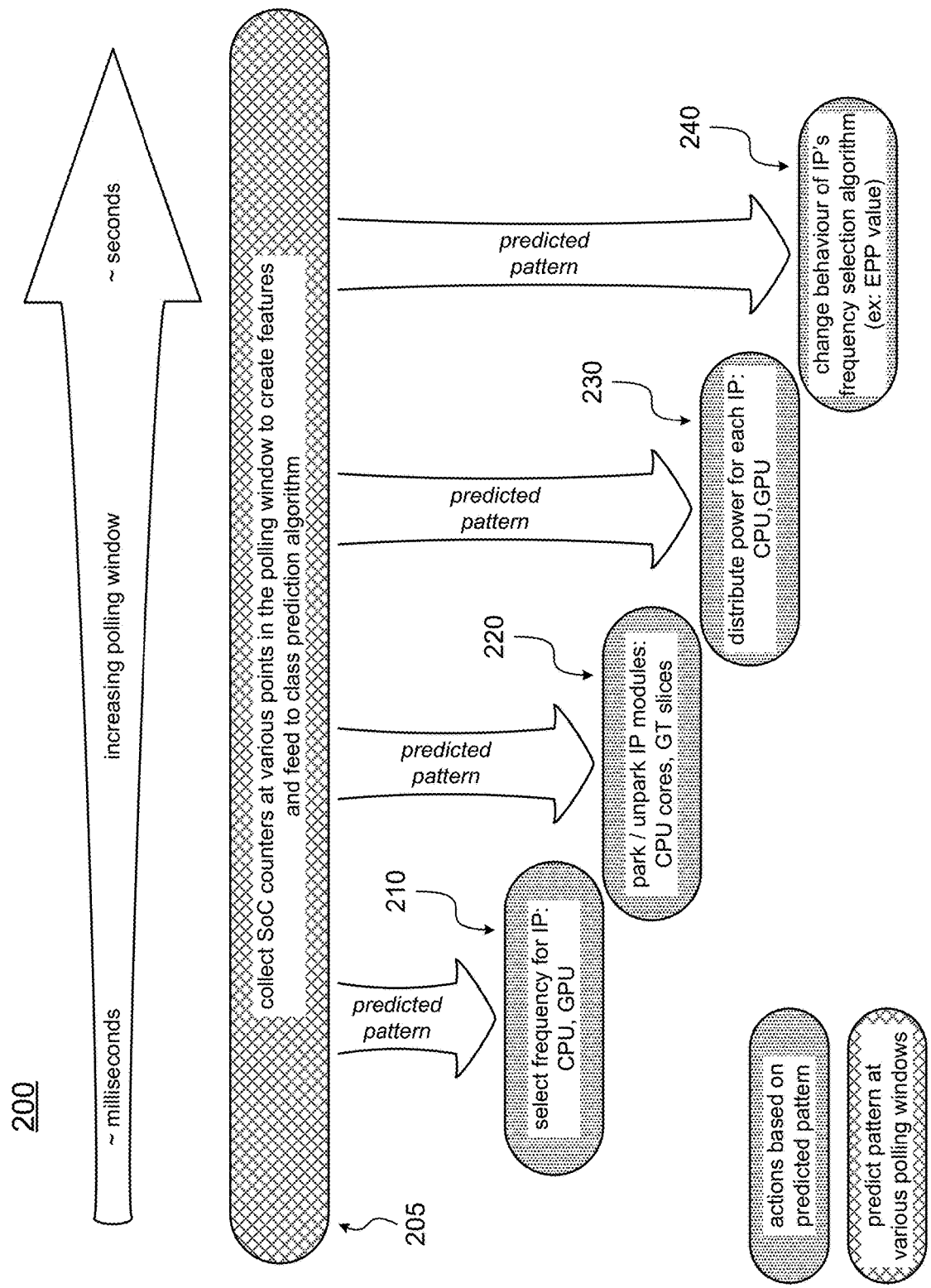
FIG. 2 illustrates power management actions that a Machine Learning (ML) based power management technique may take at various levels of a power-management stack, in accordance with some embodiments of the disclosure.

FIG. 2 illustrates power management actions that an ML-based power management technique may take at various levels of a power-management stack, in accordance with some embodiments of the disclosure. Over a range of polling-window sizes 200, ML-based workload classification techniques 205 may be employed, which may result in a first set of actions 210 at a first (and smallest) polling window size; a second set of actions 220 at a second, larger polling window size; a third set of actions 230 at a third, still larger polling window size; and a fourth set of actions 240 at a fourth (and largest) polling window size.

As depicted, ML-based workload classification techniques 205 may be applied at different levels of a power management stack, and may depend upon the size of a polling window in which data is gathered. Techniques 205 may comprise collecting values of various SoC counters at various points in a polling window to create a set of learned parameters (e.g., a set of features), then providing that set of features to a classification predictor algorithm (as disclosed herein).

If the classification predictor algorithm indicates a predicted pattern, various actions may be taken. At the smallest polling window size, a frequency may be selected for an IP (e.g., a CPU or a GPU). At the next-largest polling window size, one or more IP modules (e.g., CPU cores or graphics-processing slices) may be parked or unparked. At the next-largest polling window size, power may be distributed for one or more IPs (e.g., a CPUs and/or GPUs). At the largest polling window size, behavior of an IP's frequency-selection algorithm may be changed (e.g., by changing an EPP value).

Workloads may be classified using ML techniques that comprise a training phase and deployment phase, based on features such as SoC counter data and PM telemetry data. In the training phase, a workload may be initiated, and data may be collected for that workload and fed into a classification algorithm to learn parameters for prediction. The collected data may be from a specific set of sources that may include registers, counters, and/or MSRs (e.g., for an SoC).

A single snapshot of data from these sources might not facilitate detection of various types of workloads. Accordingly, instead of taking a single snapshot of data, multiple snapshots of data taken over a polling period. The data from these sources may thus be polled at regular intervals while a workload is running and may be concatenated to form a set of features that may form the basis of an ML-based analysis. The number of snapshots to concatenate may depend upon a length of unique patterns of the workloads.

For example, a number of counters and/or other sources may be represented as number $N_{COUNTERS}$, a polling period may be represented as a number $P_{POLLING}$ (e.g., in ms (milliseconds)), and a fixed duration may be represented as a number $P_{HISTORY}$ (e.g., in ms). If the set of features for the analysis is a concatenation of a set of data for the $N_{COUNTERS}$ sources as polled a number of times ($P_{HISTORY}/$ $P_{POLLING}$), then a number of features $N_{FEATURES}$ in the set of features may be represented as the number of polls taken multiplied by the number of counters:

$$N_{FEATURES} = (P_{HISTORY}/P_{POLLING}) * N_{COUNTERS}$$

The length of the polling period $P_{POLLING}$ may depend upon the level of the PM stack being targeted (as depicted in FIG. 2). For example, for some purposes, 2 seconds of concatenated data may be appropriate. The concatenated sets of counter values may then be a feature set for use in training a classification algorithm. A set of features for a supervised classification learning algorithm for a current polling window may accordingly be generated through concatenating samples of data collected over a recent fixed duration.

Table 1 below shows some counters that may be polled to generate a set of features. These counters are merely examples, and other sets of counters (which may incorporate some of, all of, or none of these counters) may be polled to generate a set of features.

TABLE 1

Counters used as features for Workload Classification

| Counter Category | Counters | | |
|---|---|---|---|
| Power | CPUPower | GraphicsPower | SoCPower |
|  | MemoryPower |  |  |
| Every Core | CoreFrequency | CoreLoad | CoreScalability |
|  | C3Residency | C6Residency | C7Residency |
| Graphics | GfxFrequency | GfxLoad | GfxRC6 |
|  | FramesPerSecond |  |  |
| Package | PkgIaC0AnySum | PkgIaC0Any | PkgC2Residency |
| Residency | PkgC3Residency | PkgC6Residency | PkgC7Residency |
| Counters (1) | PkgC8Residency | PkgC9Residency | PkgC10Residency |
| Package | PkgGtC0Any | PkgGtC0AnySlices | PkgGtC0SlicesSum |
| Residency | PkgGtC0AnyMedia | PkgGtAndIaOverlap |  |
| Counters (2) |  |  |  |
| Memory | RequestCountFromIa | RequestCountFromGt | RequestCountFromIo |
|  | RequestReadDataCount | RequestWriteDataCount |  |

The training phase may be undertaken while running a range of workloads. Moreover, the more data is used, the more accurate the learning algorithm may be.

Accordingly, for each workload of a range of workloads, a set of features (or learning parameters) may be provided to a classification algorithm (e.g., an ML algorithm) in order to generate a set of learned parameters. These learned parameters may depend on the kind of classification algorithm and the number of workload types. For example, a Linear Support Vector Classification algorithm may be used (e.g., sklearn.svm.LinearSVC, from scikit-learn.org). The algorithm used may output a weight for each feature, and the weights may then be used to identify one category of workload (e.g., as with a One-vs-Rest (OvR) strategy).

The deployment phase may then follow the training phase. The set of learned parameters associated with a category of workload may be supplied to a classification predictor algorithm. Then, during a system's run-time, a set of data may be gathered in a manner analogous to the manner in which sets of features are gathered during the training phase. Accordingly, values of the same list of counters as used in the training phase may be polled over a period of the same length (e.g., $P_{HISTORY}$) at the same regular interval (e.g., $P_{POLLING}$) and for the same number of times (e.g., $P_{HISTORY}/P_{POLLING}$). As a result, a number of features may be obtained will be the same as in the training phase (e.g., $N_{FEATURES}$). The set of features may then be supplied to the classification predictor algorithm, which may analyze the set of features against the set of learned parameters and make a prediction as to whether the workload running when the set of features was captured is of the category of workload with which the classification predictor algorithm is associated.

The use of workload classification using ML mechanisms and methods as discussed herein may have various benefits. First, workload detection may add value to any frequency-selection algorithm. Various actions may be associated with types of workloads in many different ways in order to achieve power and/or performance objectives.

Another benefit may relate to smart power capping and/or smart power distribution, by which a power limit may be provided under which an IP may be disposed to operate. A frequency selection algorithm for an IP may be disposed to selecting a frequency such that power consumption for that IP should not cross a power limit. By using ML-based workload classification as disclosed herein, different power limits may be proposed based on different types of workload, and may be learned from a set of PM telemetry parameters.

In experiments to employ ML based workload-classification mechanisms and methods for power management, a set of learned parameters for low-response workloads was generated in a training phase, and deployed against a variety of benchmarks. Upon detecting of a low-response workload, a power management action was taken (e.g., capping power on total power consumed by all cores of CPU to power consumed by one core when run with highest possible frequency). Among the observed benefits were the achievement of lower power consumption and better efficiencies for benchmarks incorporating low-response workloads without impacting power consumption and performance on benchmarks incorporating other categories of workloads.

Figure 3:
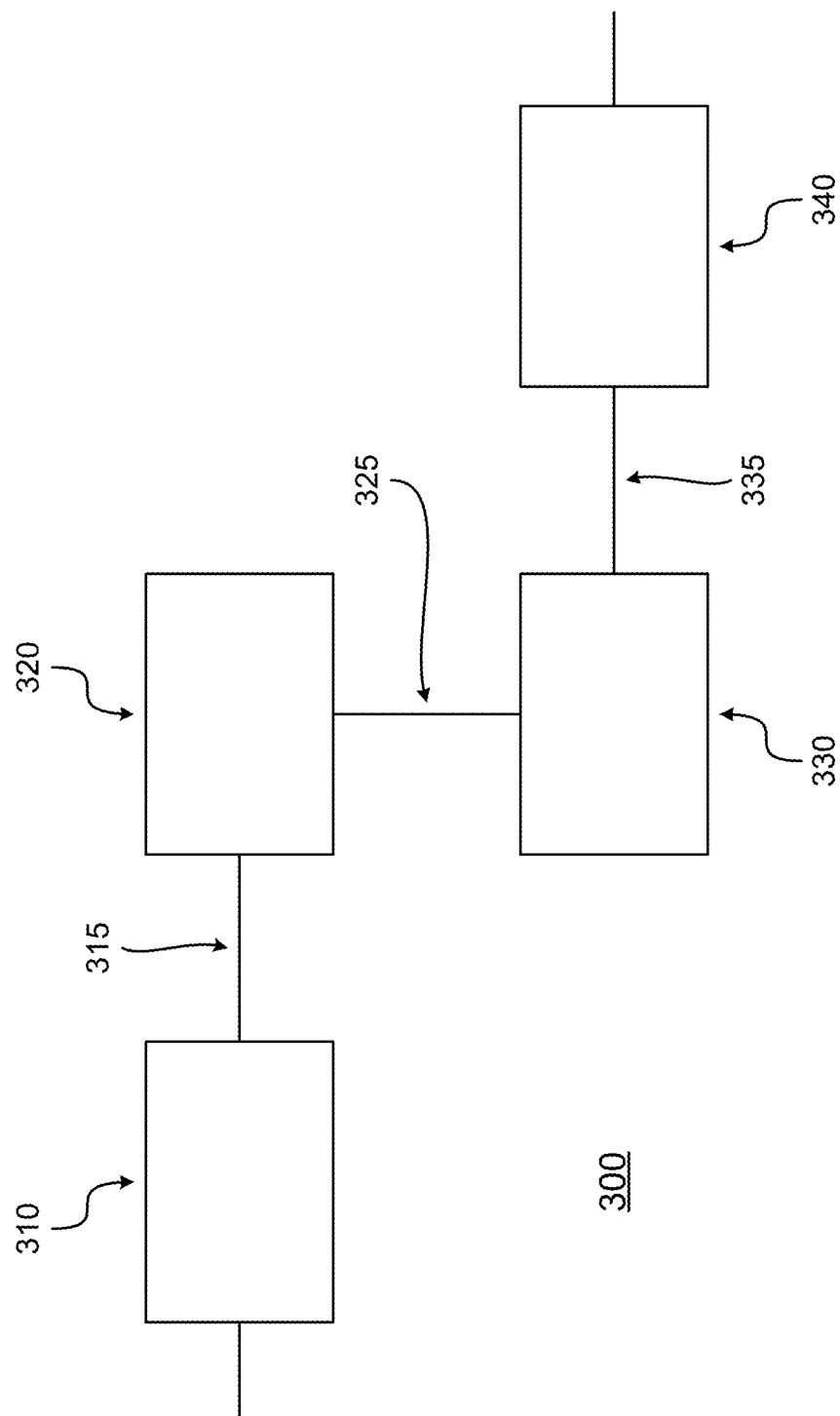
FIG. 3 illustrates a design incorporating circuitries for applying ML techniques for power management at different levels of a power management stack, in accordance with some embodiments of the disclosure.

FIG. 3 illustrates a design incorporating circuitries for applying ML techniques for power management at different levels of a power management stack, in accordance with some embodiments of the disclosure. A design 300 may comprise a first circuitry 310, a second circuitry 320, a third circuitry 330, and a fourth circuitry 340.

In a variety of embodiments, first circuitry 310 may have a plurality of memory registers. Second circuitry 320 may be operable to establish values for a plurality of features based on samples of values of the plurality of memory registers taken at one or more times within a range of time of predetermined length. First circuitry 310 may be operable to provide information regarding the plurality of memory registers to second circuitry 320 via an interface 315. Third circuitry 330 may be operable to compare the plurality of features against a plurality of learned parameters for a reference workload. Second circuitry 320 may be operable to provide information regarding the plurality of features to third circuitry 330 via an interface 325.

In various alternate embodiments, first circuitry 310 may have a plurality of memory registers; second circuitry 320 may be operable to establish values for a plurality of features based on samples of values of the plurality of memory registers taken at one or more times spaced by a predetermined period; third circuitry 330 may be operable to compare the plurality of features against a plurality of learned parameters for a reference workload, the comparison including at least one matrix mathematics operation; and fourth circuitry 340 may be operable to trigger one or more actions based upon the result of the comparison.

In some embodiments, the plurality of memory registers may include one or more counters, which may correspond various power-management telemetry information, such as various SoC counters and/or MSRs. For some embodiments, at least some of the memory registers may correspond to a power value, a frequency value, a load value, a residency value, a frames-per-second value, and/or a memory access value (e.g., as shown in Table 1 above). In some embodiments, the one or more times at which the samples of the values of the plurality of memory registers are taken may be spaced from each other by a predetermined length of time.

For some embodiments, the plurality of features may be a concatenated set of the samples of values taken at the one or more times. For example, the plurality of features may be multiple concatenated samples of a set of PM telemetry information. In some embodiments, the reference workload may be a high-CPU-load workload, a low-CPU-load workload, a video-playback workload, or a video-rendering workload. For some embodiments, the number of features of the plurality of features may be the same as the number of learned parameters of the plurality of learned parameters.

In some embodiments, the comparison may include at least one matrix mathematics operation, such as an array multiplication operation. For some embodiments, fourth circuitry 340 may be operable to trigger one or more actions based upon the result of the comparison. Third circuitry 330 may be operable to provide information regarding the result of the comparison to fourth circuitry 340 via an interface 335. In various embodiments, the one or more actions may include selecting a frequency and/or establishing a power limit.

In some embodiments, the plurality of learned parameters for the reference workload may be a first plurality of learned parameters for the first reference workload, and third circuitry 330 may be operable to compare the plurality of features against a second plurality of learned parameters for a second reference workload.

Figure 4:
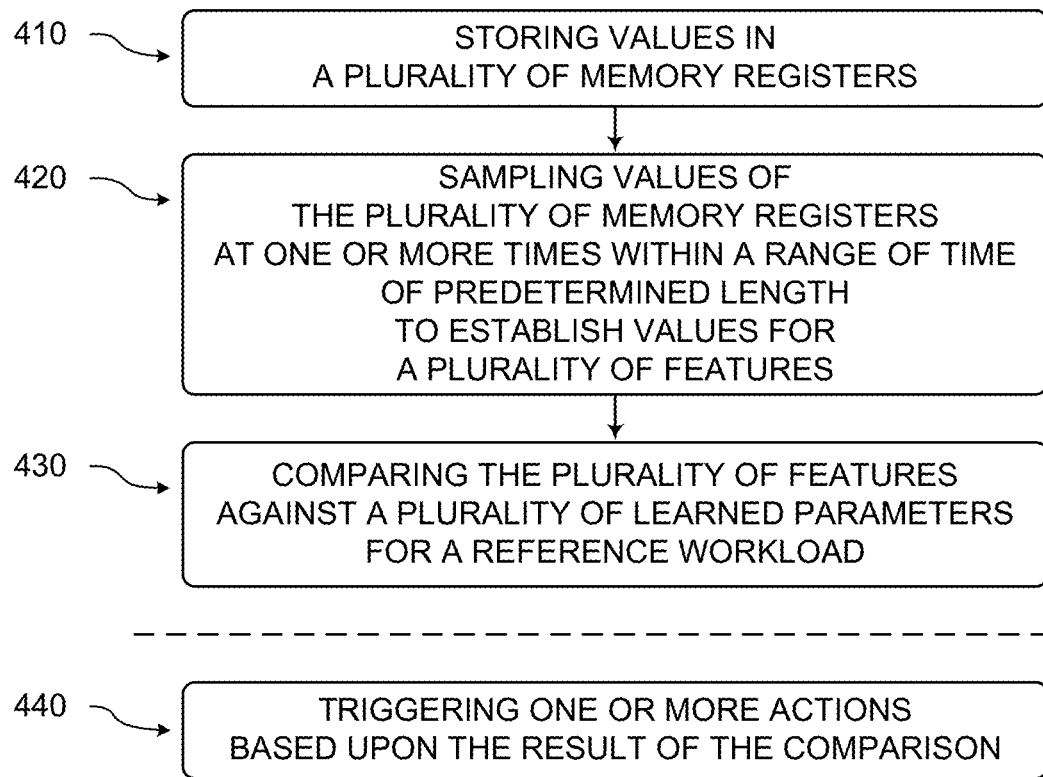
FIG. 4 illustrates methods for applying ML techniques for power management at different levels of a power management stack, in accordance with some embodiments of the disclosure.

FIG. 4 illustrates methods for applying ML techniques for power management at different levels of a power management stack, in accordance with some embodiments of the disclosure. A method 400 may comprise a storing 410, a sampling 420, a comparing 430. Method 400 may also comprise a triggering 440.

In storing 410, values may be stored in a plurality of memory registers (e.g., SoC counters and/or MSRs). In sampling 420, values of the plurality of memory registers may be sampled at one or more times within a range of time of predetermined length to establish values for a plurality of features. In comparing 430, the plurality of features may be compared against a plurality of learned parameters for a reference workload.

In some embodiments, in triggering 440, one or more actions may be triggered based upon the result of the comparison. The one or more actions may include selecting a frequency and/or establishing a power limit.

For some embodiments, at least some of the memory registers may correspond to: a power value; a frequency value; a load value; a residency value; a frames-per-second value; and/or a memory access value (as disclosed in Table 1, for example). The reference workload may be a high-CPU-load workload, a low-CPU-load workload, a video-playback workload, or a video-rendering workload.

In some embodiments, the number of features of the plurality of features may be the same as the number of learned parameters of the plurality of learned parameters. The comparison may include at least one matrix mathematics operation (e.g., an array multiplication operation).

Although the actions in the flowchart with reference to FIG. 4 are shown in a particular order, the order of the actions can be modified. Thus, the illustrated embodiments can be performed in a different order, and some actions may be performed in parallel. Some of the actions and/or operations listed in FIG. 4 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIG. 4.

Moreover, in some embodiments, machine readable storage media may have executable instructions that, when executed, cause one or more processors to perform an operation comprising a method of FIG. 4. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 5:
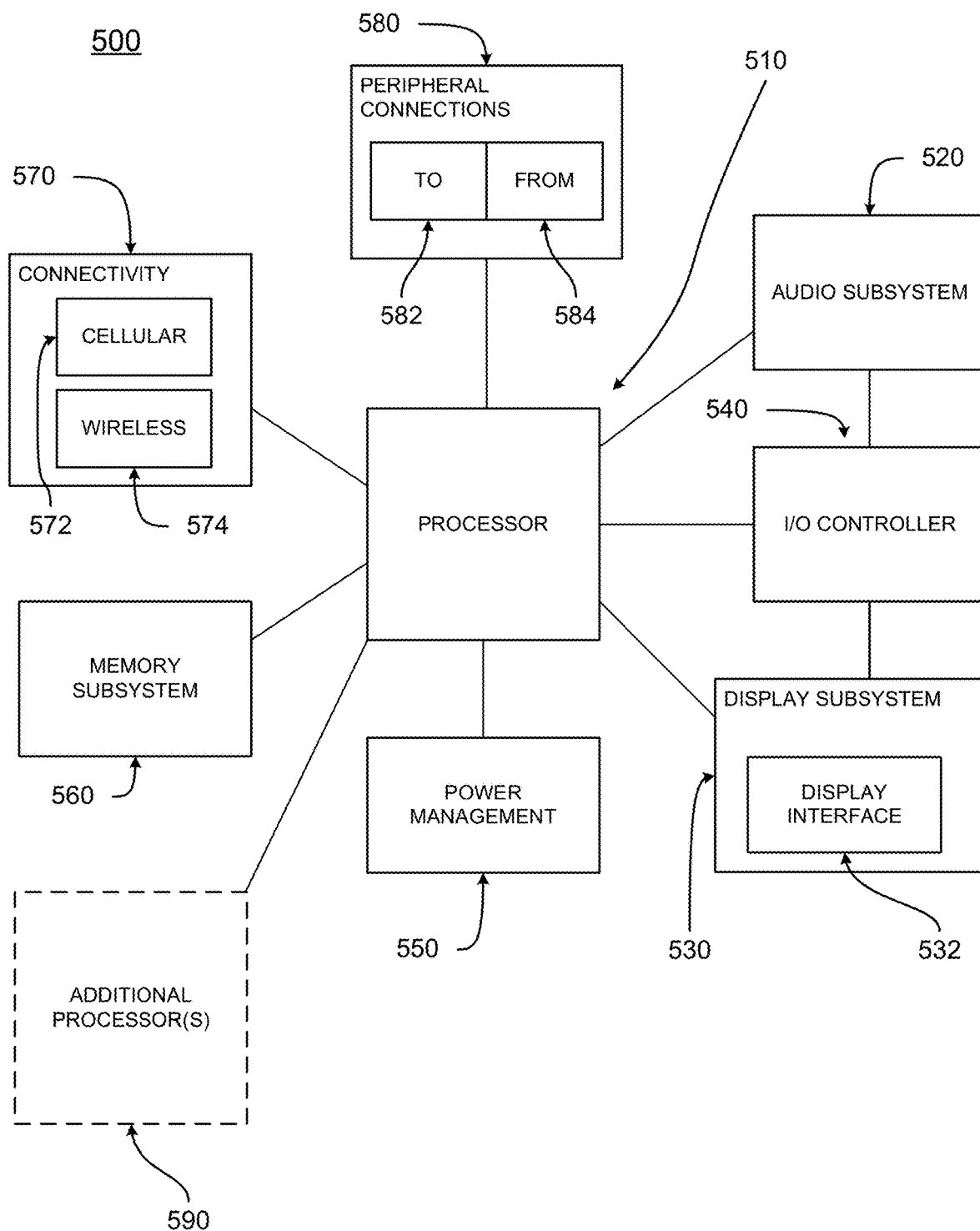
FIG. 5 illustrates a computing device with mechanisms for applying Machine Learning (ML) techniques for power management at different levels of a power management stack, in accordance with some embodiments of the disclosure.

FIG. 5 illustrates a computing device with mechanisms for applying Machine Learning (ML) techniques for power management at different levels of a power management stack, in accordance with some embodiments of the disclosure. Computing device 500 may be a computer system, an SoC, a tablet, a mobile device, a smart device, or a smart phone with mechanisms for applying Machine Learning (ML) techniques for power management at different levels of a power management stack, in accordance with some embodiments of the disclosure. It will be understood that certain components of computing device 500 are shown generally, and not all components of such a device are shown FIG. 5. Moreover, while some of the components may be physically separate, others may be integrated within the same physical package, or even on the same physical silicon die. Accordingly, the separation between the various components as depicted in FIG. 5 may not be physical in some cases, but may instead be a functional separation. It is also pointed out that those elements of FIG. 5 having the same names or reference numbers as the elements of any other figure can operate or function in any manner similar to that described, but are not limited to such.

In various embodiments, the components of computing device 500 may include any of a processor 510, an audio subsystem 520, a display subsystem 530, an I/O controller 540, a power management component 550, a memory subsystem 560, a connectivity component 570, one or more peripheral connections 580, and one or more additional processors 590. In some embodiments, processor 510 may include mechanisms for applying Machine Learning (ML) techniques for power management at different levels of a power management stack, in accordance with some embodiments of the disclosure. In various embodiments, however, any of the components of computing device 500 may include the mechanisms for applying Machine Learning (ML) techniques for power management at different levels of a power management stack, in accordance with some embodiments of the disclosure. In addition, one or more components of computing device 500 may include an interconnect fabric having a plurality of ports, such as a router, a network of routers, or a Network-on-a-Chip (NoC).

In some embodiments, computing device 500 may be a mobile device which may be operable to use flat surface interface connectors. In one embodiment, computing device 500 may be a mobile computing device, such as a computing tablet, a mobile phone or smart-phone, a wireless-enabled e-reader, or other wireless mobile device. The various embodiments of the present disclosure may also comprise a network interface within 570 such as a wireless interface so that a system embodiment may be incorporated into a wireless device, for example a cell phone or personal digital assistant.

Processor 510 may be a general-purpose processor or CPU (Central Processing Unit). In some embodiments, processor 510 may include one or more physical devices, such as microprocessors, application processors, microcontrollers, programmable logic devices, or other processing means. The processing operations performed by processor 510 may include the execution of an operating platform or operating system on which applications and/or device functions may then be executed. The processing operations may also include operations related to one or more of the following: audio I/O; display I/O; power management; connecting computing device 500 to another device; and/or I/O (input/output) with a human user or with other devices.

Audio subsystem 520 may include hardware components (e.g., audio hardware and audio circuits) and software components (e.g., drivers and/or codecs) associated with providing audio functions to computing device 500. Audio functions can include speaker and/or headphone output as well as microphone input. Devices for such functions can be integrated into computing device 500, or connected to computing device 500. In one embodiment, a user interacts with computing device 500 by providing audio commands that are received and processed by processor 510.

Display subsystem 530 may include hardware components (e.g., display devices) and software components (e.g., drivers) that provide a visual and/or tactile display for a user to interact with computing device 500. Display subsystem 530 may include a display interface 532, which may be a particular screen or hardware device used to provide a display to a user. In one embodiment, display interface 532 includes logic separate from processor 510 to perform at least some processing related to the display. In some embodiments, display subsystem 530 includes a touch screen (or touch pad) device that provides both output and input to a user.

I/O controller 540 may include hardware devices and software components related to interaction with a user. I/O controller 540 may be operable to manage hardware that is part of audio subsystem 520 and/or display subsystem 530. Additionally, I/O controller 540 may be a connection point for additional devices that connect to computing device 500, through which a user might interact with the system. For example, devices that can be attached to computing device 500 might include microphone devices, speaker or stereo systems, video systems or other display devices, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of computing device 500. Additionally, audio output can be provided instead of, or in addition to, display output. In another example, if display subsystem 530 includes a touch screen, the display device may also act as an input device, which can be at least partially managed by I/O controller 540. There can also be additional buttons or switches on computing device 500 to provide I/O functions managed by I/O controller 540.

In some embodiments, I/O controller 540 manages devices such as accelerometers, cameras, light sensors or other environmental sensors, or other hardware that can be included in computing device 500. The input can be part of direct user interaction, and may provide environmental input to the system to influence its operations (such as filtering for noise, adjusting displays for brightness detection, applying a flash for a camera, or other features).

Power management component 550 may include hardware components (e.g., power management devices and/or circuitry) and software components (e.g., drivers and/or firmware) associated with managing battery power usage, battery charging, and features related to power saving operation.

Memory subsystem 560 may include one or more memory devices for storing information in computing device 500. Memory subsystem 560 can include nonvolatile memory devices (whose state does not change if power to the memory device is interrupted) and/or volatile memory devices (whose state is indeterminate if power to the memory device is interrupted). Memory subsystem 560 can store application data, user data, music, photos, documents, or other data, as well as system data (whether long-term or temporary) related to the execution of the applications and functions of computing device 500.

Some portion of memory subsystem 560 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 570 may include a network interface, such as a cellular interface 572 or a wireless interface 574 (so that an embodiment of computing device 500 may be incorporated into a wireless device such as a cellular phone or a personal digital assistant). In some embodiments, connectivity component 570 includes hardware devices (e.g., wireless and/or wired connectors and communication hardware) and software components (e.g., drivers and/or protocol stacks) to enable computing device 500 to communicate with external devices. Computing device 500 could include separate devices, such as other computing devices, wireless access points or base stations, as well as peripherals such as headsets, printers, or other devices.

In some embodiments, connectivity component 570 can include multiple different types of network interfaces, such as one or more wireless interfaces for allowing processor 510 to communicate with another device. To generalize, computing device 500 is illustrated with cellular interface 572 and wireless interface 574. Cellular interface 572 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 574 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 580 may include hardware interfaces and connectors, as well as software components (e.g., drivers and/or protocol stacks) to make peripheral connections. It will be understood that computing device 500 could both be a peripheral device to other computing devices (via "to" 582), as well as have peripheral devices connected to it (via "from" 584). The computing device 500 may have a "docking" connector to connect to other computing devices for purposes such as managing content on computing device 500 (e.g., downloading and/or uploading, changing, synchronizing). Additionally, a docking connector can allow computing device 500 to connect to certain peripherals that allow computing device 500 to control content output, for example, to audiovisual or other systems.

In addition to a proprietary docking connector or other proprietary connection hardware, computing device 500 can make peripheral connections 580 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus comprising: a first circuitry having a plurality of memory registers; a second circuitry to establish values for a plurality of features based on samples of values of the plurality of memory registers taken at one or more times within a range of time of predetermined length; and a third circuitry to compare the values of plurality of features against values of a plurality of learned parameters for a reference workload.

In example 2, the apparatus of example 1, wherein the plurality of memory registers includes one or more counters.

In example 3, the apparatus of example 1, wherein at least some of the memory registers correspond to at least one of: a power value; a frequency value; a load value; a residency value; a frames-per-second value; or a memory access value.

In example 4, the apparatus of example 1, wherein the one or more times are spaced from each other by a predetermined length of time.

In example 5, the apparatus of example 1, wherein the plurality of features are a concatenated set of the samples of values taken at the one or more times.

In example 6, the apparatus of example 1, wherein the reference workload is one of a high-processor-load workload, a low-processor-load workload, a video-playback workload, and a video-rendering workload.

In example 7, the apparatus of example 1, wherein the number of features of the plurality of features is substantially the same as the number of learned parameters of the plurality of learned parameters.

In example 8, the apparatus of example 1, wherein the comparison includes at least one matrix mathematics operation.

In example 9, the apparatus of example 1, comprising: a fourth circuitry to trigger one or more actions based upon the result of the comparison.

In example 10, the apparatus of example 9, wherein the one or more actions include at least one of: selecting a frequency; or establishing a power limit.

In example 11, the apparatus of example 1, wherein the plurality of learned parameters for the reference workload is a first plurality of learned parameters for the first reference workload; and wherein the third circuitry is to compare the plurality of features against a second plurality of learned parameters for a second reference workload.

Example 12 provides an apparatus comprising: a first circuitry having a plurality of memory registers; a second circuitry to establish values for a plurality of features based on samples of values of the plurality of memory registers taken at one or more times spaced by a predetermined period; a third circuitry to compare the values of the plurality of features against a values of a plurality of learned parameters for a reference workload, the comparison including at least one matrix mathematics operation; and a fourth circuitry to trigger one or more actions based upon the result of the comparison.

In example 13, the apparatus of example 12, wherein the plurality of learned parameters for the reference workload is a first plurality of learned parameters for the first reference workload; and wherein the third circuitry is to compare the values of the plurality of features against a second plurality of learned parameters for a second reference workload.

In example 14, the apparatus of example 12, wherein the number of features of the plurality of features is substantially the same as the number of learned parameters of the plurality of learned parameters.

In example 15, the apparatus of example 12, wherein the reference workload is one of a high-processor-load workload, a low-processor-load workload, a video-playback workload, and a video-rendering workload.

In example 16, the apparatus of example 15, wherein the one or more actions include at least one of: selecting a frequency; or establishing a power limit.

Example 17 provides a system comprising a memory, a processor coupled to the memory, and a wireless interface for allowing the processor to communicate with another device, the processor including: a first circuitry having a plurality of memory registers; a second circuitry to establish values for a plurality of features based on samples of values of the plurality of memory registers taken at one or more times within a range of time of predetermined length; and a third circuitry to compare the values of the plurality of features against a first plurality of learned parameters for a first reference workload, and to compare the values of the plurality of features against a second plurality of learned parameters for a second reference workload.

In example 18, the system of example 17, wherein the plurality of memory registers includes one or more counters; and wherein at least some of the memory registers correspond to at least one of: a power value; a frequency value; a load value; a residency value; a frames-per-second value; or a memory access value.

In example 19, the system of example 17, wherein the number of features of the plurality of features is substantially the same as the number of learned parameters of the plurality of learned parameters; and wherein the comparison includes at least one matrix mathematics operation.

In example 20, the system of example 17, comprising: a fourth circuitry to trigger one or more actions based upon the result of the comparison, wherein the one or more actions include at least one of: selecting a frequency; or establishing a power limit.

Example 21 provides a method comprising: storing values in a plurality of memory registers; sampling values of the plurality of memory registers at one or more times within a range of time of predetermined length to establish values for a plurality of features; and comparing the values of the plurality of features against a plurality of learned parameters for a reference workload.

In example 22, the method of example 21, comprising: triggering one or more actions based upon the result of the comparison, wherein the one or more actions include at least one of: selecting a frequency; or establishing a power limit.

In example 23, the method of example 21, wherein at least some of the memory registers correspond to at least one of: a power value; a frequency value; a load value; a residency value; a frames-per-second value; or a memory access value; and wherein the reference workload is one of a high-processor-load workload, a low-processor-load workload, a video-playback workload, and a video-rendering workload.

In example 24, the method of example 21, wherein the number of features of the plurality of features is substantially the same as the number of learned parameters of the plurality of learned parameters; and wherein the comparison includes at least one matrix mathematics operation.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. An apparatus comprising:
   a first circuitry having a plurality of memory registers wherein the plurality of memory registers is part of one or more counters, wherein at least some of the memory registers correspond to at least one of power value or frequency value;
   a second circuitry to establish values for a plurality of features based on samples of values of the plurality of memory registers taken at one or more times within a range of time of predetermined length; and
   a third circuitry to compare the values of plurality of features against values of a plurality of learned parameters for a reference workload.
2. The apparatus of claim 1,
   wherein at least some of the memory registers correspond to at least one of: a load value; a residency value; a frames-per-second value; or a memory access value.
3. The apparatus of claim 1,
   wherein the one or more times are spaced from each other by a predetermined length of time.
4. The apparatus of claim 1,
   wherein the plurality of features is a concatenated set of the samples of values taken at the one or more times.
5. The apparatus of claim 1,
   wherein the reference workload is one of a high-processor-load workload, a low-processor-load workload, a video-playback workload, or a video-rendering workload.

6. The apparatus of claim 1,
wherein a number of features of the plurality of features is substantially same as a number of learned parameters of the plurality of learned parameters.

7. The apparatus of claim 1,
wherein the comparison includes at least one matrix mathematics operation.

8. The apparatus of claim 1, comprising:
a fourth circuitry to trigger one or more actions based upon a result of the comparison.

9. The apparatus of claim 8,
wherein the one or more actions include at least one of: selecting a frequency; or establishing a power limit.

10. The apparatus of claim 1,
wherein the plurality of learned parameters for the reference workload is a first plurality of learned parameters for the first reference workload; and
wherein the third circuitry is to compare the plurality of features against a second plurality of learned parameters for a second reference workload.

11. An apparatus comprising:
a first circuitry having a plurality of memory registers wherein the plurality of memory registers is part of one or more counters, wherein at least some of the memory registers correspond to at least one of power value or frequency value;
a second circuitry to establish values for a plurality of features based on samples of values of the plurality of memory registers taken at one or more times spaced by a predetermined period;
a third circuitry to compare the values of the plurality of features against values of a plurality of learned parameters for a reference workload, the comparison including at least one matrix mathematics operation; and
a fourth circuitry to trigger one or more actions based upon a result of the comparison.

12. The apparatus of claim 11,
wherein the plurality of learned parameters for the reference workload is a first plurality of learned parameters for a first reference workload; and
wherein the third circuitry is to compare the values of the plurality of features against a second plurality of learned parameters for a second reference workload.

13. The apparatus of claim 11,
wherein a number of features of the plurality of features is substantially same as a number of learned parameters of the plurality of learned parameters.

14. The apparatus of claim 11,
wherein the reference workload is one of a high-processor-load workload, a low-processor-load workload, a video-playback workload, or a video-rendering workload.

15. The apparatus of claim 14,
wherein the one or more actions include at least one of: selecting a frequency; or establishing a power limit.

16. A system comprising a memory, a processor coupled to the memory, and a wireless interface for allowing the processor to communicate with another device, the processor including:
a first circuitry having a plurality of memory registers;
a second circuitry to establish values for a plurality of features based on samples of values of the plurality of memory registers taken at one or more times within a range of time of predetermined length; and
a third circuitry to compare the values of the plurality of features against a first plurality of learned parameters for a first reference workload, and to compare the values of the plurality of features against a second plurality of learned parameters for a second reference workload,
wherein the plurality of memory registers is part of one or more counters, wherein at least some memory registers of the plurality of memory registers correspond to at least one of: a power value; a frequency value.

17. The system of claim 16,
wherein at least some of the memory registers correspond to at least one of: a load value; a residency value; a frames-per-second value; or a memory access value.

18. The system of claim 16,
wherein a number of features of the plurality of features is substantially same as a number of learned parameters of the plurality of learned parameters; and
wherein the comparison includes at least one matrix mathematics operation.

19. The system of claim 16, comprising:
a fourth circuitry to trigger one or more actions based upon a result of the comparison,
wherein the one or more actions include at least one of: selecting a frequency; or establishing a power limit.

* * * * *